United States Patent [19]

Lim

[11] Patent Number: 5,589,751
[45] Date of Patent: Dec. 31, 1996

[54] SENSORLESS SWITCHED RELUCTANCE MOTOR

[75] Inventor: Jun Y. Lim, Seoul, Rep. of Korea

[73] Assignee: Goldstar Co., Ltd., Seoul, Rep. of Korea

[21] Appl. No.: 167,361

[22] Filed: Dec. 16, 1993

[30] Foreign Application Priority Data

Dec. 17, 1992 [KR] Rep. of Korea ............... 24724/1992
Dec. 17, 1992 [KR] Rep. of Korea ............... 24725/1992
Jan. 29, 1993 [KR] Rep. of Korea ............... 1155/1993

[51] Int. Cl.$^6$ ............................................. H02P 6/02
[52] U.S. Cl. ............................... 318/701; 318/254
[58] Field of Search .......................... 318/701, 254, 318/138, 439

[56] References Cited

U.S. PATENT DOCUMENTS

| | | | |
|---|---|---|---|
| 4,186,435 | 1/1980 | Cailloux | 318/722 X |
| 4,353,016 | 10/1982 | Born | 318/439 X |
| 4,401,934 | 8/1983 | Dolland et al. | 318/798 |
| 4,506,765 | 3/1985 | Payne et al. | 318/467 X |
| 4,641,066 | 2/1987 | Nagata et al. | 318/439 X |
| 5,144,231 | 10/1992 | Tenenbaum et al. | 324/164 |
| 5,160,873 | 11/1992 | Tukiyang et al. | 318/439 X |
| 5,182,500 | 1/1993 | Shimada | 318/138 X |
| 5,291,115 | 3/1994 | Ehsani | 318/701 |

*Primary Examiner*—David S. Martin
*Attorney, Agent, or Firm*—Fish & Richardson PC

[57] ABSTRACT

A sensorless SRM suitable to drive the SRM based on the position of a rotor detected through the detection of the variation of the current of each phase without providing separate sensors for identifying the position of the rotor includes a motor driving part for driving the motor by exciting phases of the motor in a predetermined sequence, a differentiating part for differentiating the currents exciting the phases of the motor respectively, an amplifying part for amplifying output voltages from the differentiating part to proper levels, and a comparing part for comparing output voltages of the amplifying part with reference voltages respectively to generate a high level signal when the output voltage of the amplifying part is higher than the reference voltage and a low level signal when the output voltage of the amplifying part is lower than the reference voltage.

3 Claims, 13 Drawing Sheets

FIG.3b
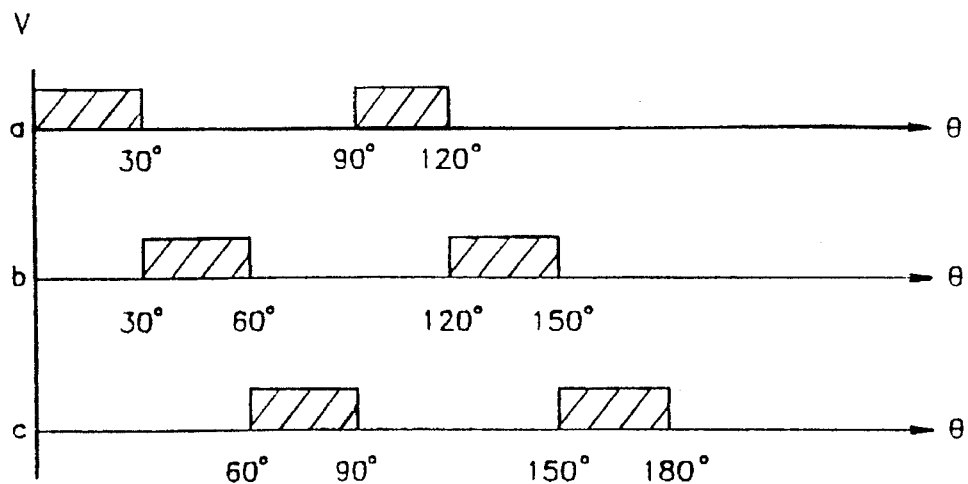
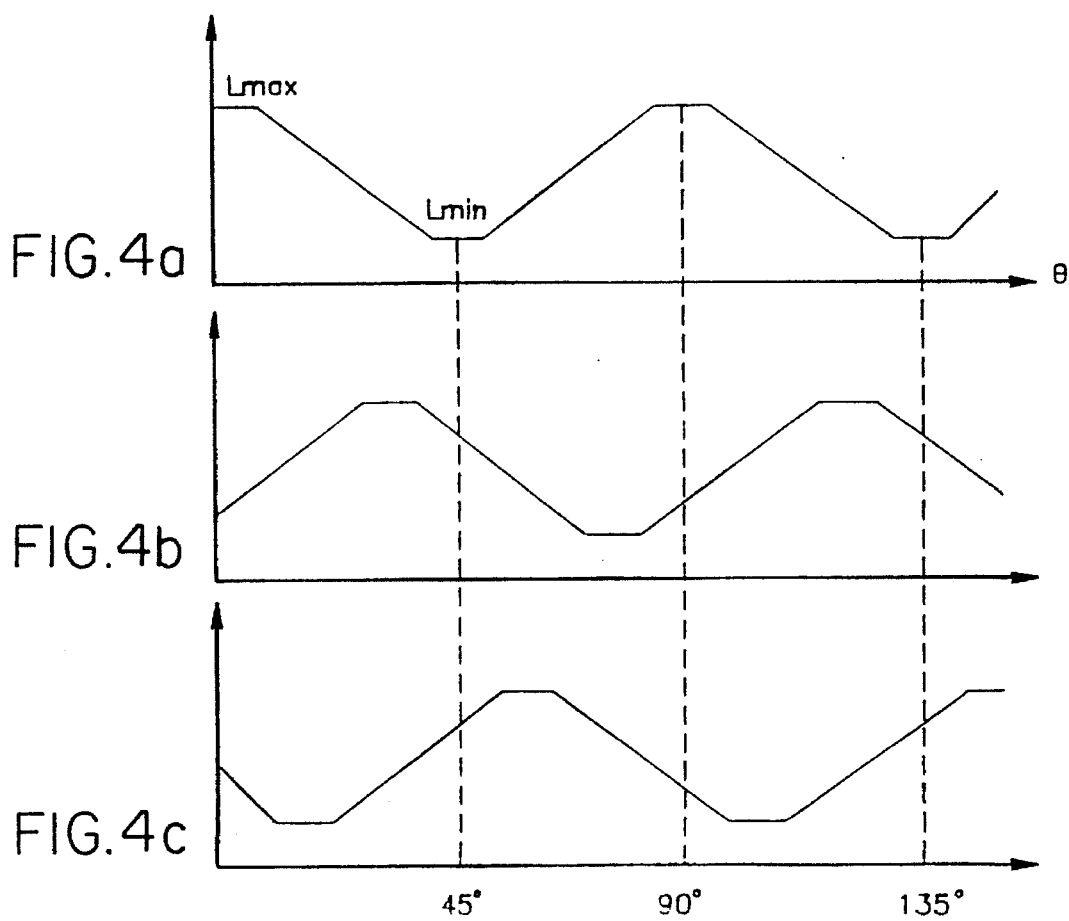
FIG.4a
FIG.4b
FIG.4c

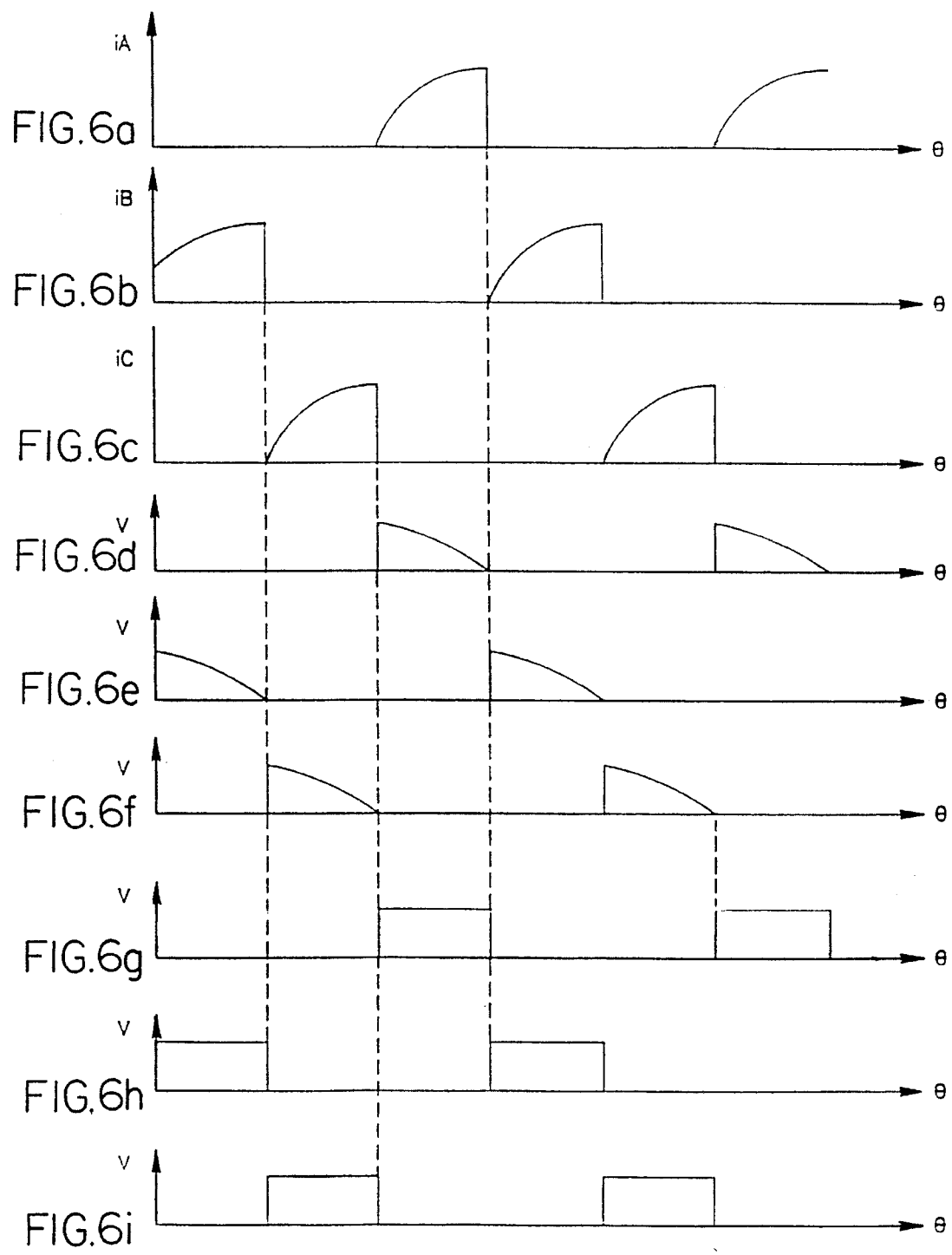

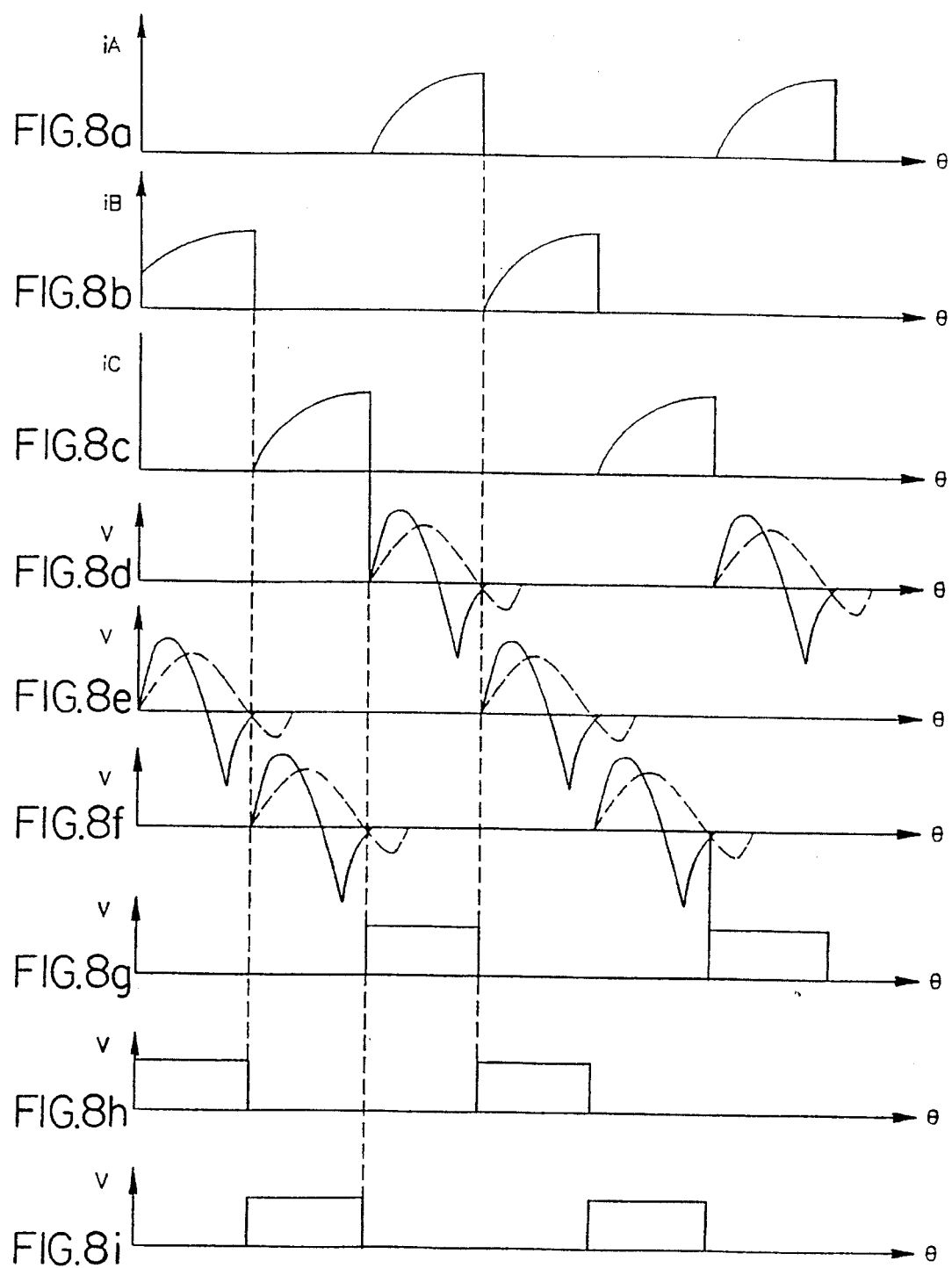

F I G.10a
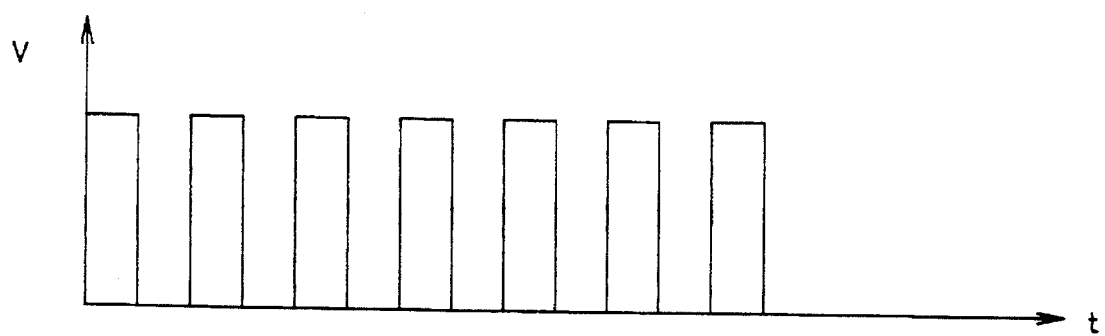
F I G.10b
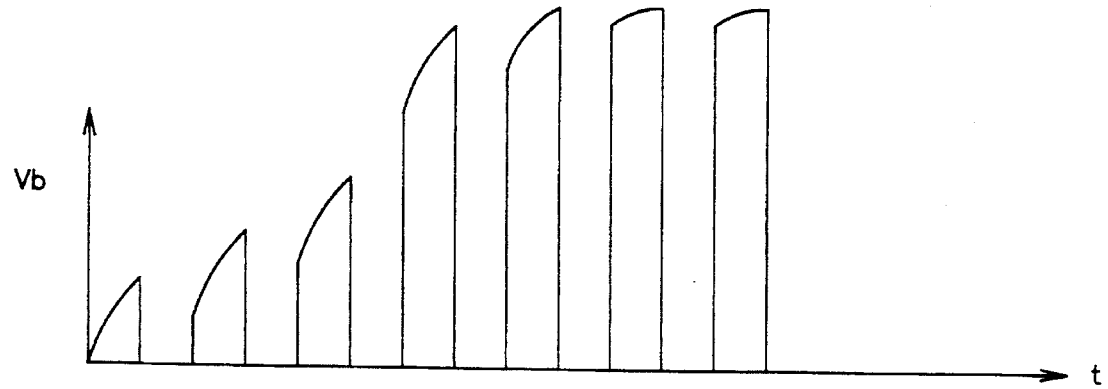
F I G.10c
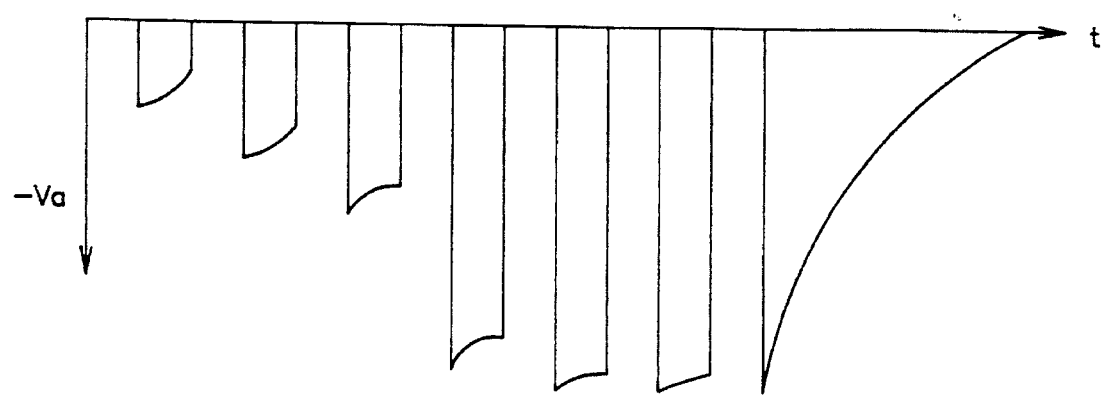

F I G.11
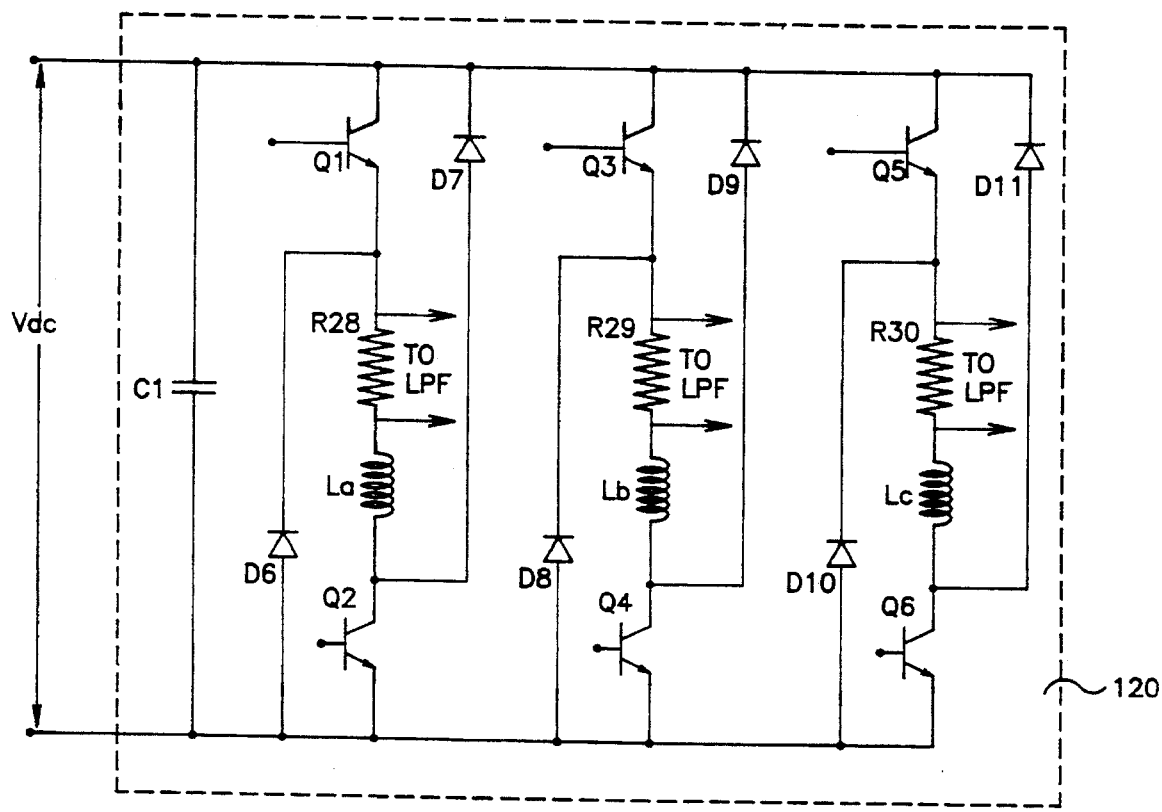

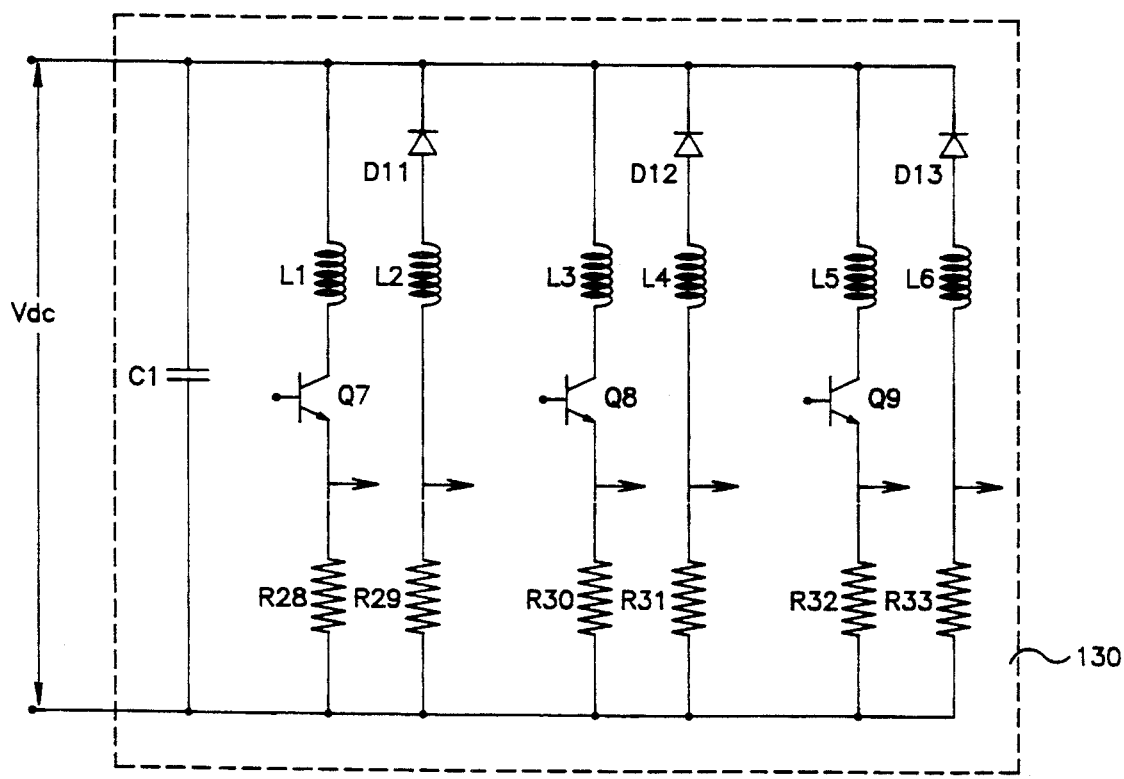
F I G.12

SENSORLESS SWITCHED RELUCTANCE MOTOR

FIELD OF THE INVENTION

This invention relates to sensorless switched reluctance motors (hereinafter called "SRM") and more particularly to sensorless SRM in which the position of a rotor is detected through detection of the variation of the current of each phase without providing separate sensors for identifying the position of the rotor.

BACKGROUND OF THE INVENTION

FIG. 1 shows rotor and sensors of a conventional SRM. A rotor 1 rotates on the generation of a magnetic field thereof by fixed magnetic poles. A sensor disc 2 is mounted on the same shaft with the rotor 1 to rotate together with the rotor 1. Position detection sensors S1, S2 and S3 detect the condition of the light passing or blocked by the sensor disc 2 on the rotation of the sensor disc 2. A logical circuit 5 generates phase excitation signals PH1, PH2 and PH3 on input of position detection signals from the position detection sensors S1, S2 and S3. The position detection sensors S1, S2 and S3 includes light emitter 3 emitting light and light receiver 4 receiving light respectively.

FIG. 2A shows a typical stator and the rotor of the SRM and FIG. 2B shows construction of a sensor disc of a conventional SRM.

As shown in FIG. 2B, the sensor disc 2 mounted on the rotor 1 and having projections 9 and cuts 10 rotates together with the rotor 1 when the rotor 1 rotates.

The light emitters 3 of the position detection sensors S1, S2 and S3 emit light on the rotation of the sensor disc 2. The light is passed or blocked by the projections 9 and the cuts 10 in the sensor disc 2. The light receiver 4 of the position detection sensors S1, S2 and S3 detect the continuous intermission of light. On supply of power to the SRM, the rotor 1 rotates and the sensor disc 2 mounted on the rotor 1 rotates. The emitted light is detected by the position detection sensors S1, S2 and S3 according to the rotation of the sensor disc 2. The light signals from the light emission are converted into a electrical signal.

The converted electrical signals are as shown in FIG. 3A.

In FIG. 3A, (a) is an output wave of the first position detection sensor S1, (b) is an output wave of the second position detection sensor S2 and (c) is an output wave of the third position detection sensor S3.

Referring to FIG. 2B, the output wave of the first position detection sensor S1 is explained. A low level signal is generated during the first 30 degrees because the light receiver 4 receives no light. The light receiver 4 receives light during next 60 degrees because the light is passed, thus the position detection sensor S1 generates a high level signal.

In this way the position detection sensor S1 generates the high or low level signal.

The signals as in FIG. 3A are supplied to the logical circuit 5 for generating phase excitation signals. Signals such as those shown in FIG. 3B are generated from the logical circuit 5. These signals drive a gate of a transistor or a base of the transistor resulting in the rotation of the motor. Signals different than the signals shown in FIG. 3B can be generated by control signals (not shown) in the logical circuit 5.

FIG. 3B shows the rotor 1 rotating in counter clockwise direction. In this case, the power should be supplied to terminal A–A' first, to B–B' next and to C–C' third in FIG. 2A. But, in order to rotate the rotor 1 in clockwise direction, the power should be supplied to terminal A–A', and to C–C' and B–B' in sequence continuously thereafter.

FIG. 4 shows changes of inductance of a coil wound on a stator 6 according to change of phase. The inductance of the coil is the largest when there in no difference in phase ie, when the coil wound part of the stator 6 is matched with the projections 9 of the rotor, 1 and the smallest when the coil wound part of the stator 6 is positioned in 45 degrees by the phase difference with the projections 9 of the rotor 1.

Generally, excitation occurs in 45 degrees by the phase difference in the SRM, starting the excitation at the point of inductance increase of the coil. The motor will be braked, if the excitation is started at the point of inductance decrease. In another word, when the signals detected by the light receivers 4 are transmitted to the logical circuit 5, the logical circuit 5 generates the phase excitation signals PH1, PH2, and PH3 as shown in 3B and transmits these signals to terminals A–A', B–B' and C–C' shown in FIG. 2A, respectively to excite A phase winding La, B phase winding Lb and C phase winding Lc in sequence to rotate the rotor 1.

However, conventional SRM have the following problems. Various machining processes to mount the position detection sensors on the motors are required in order to detect the position of the rotor. Thus, the production processes are complicated. Space is required to mount the position detection sensors inside or outside of the motors, which makes the motors larger. Special sensors are required in case the motor should be operated in high temperature where ordinary sensors are not operative. Sensors like photo-interrupt element are unable to operate when the motors contain refrigerant or lubrication oil like compressors.

SUMMARY OF THE INVENTION

The object of this invention is to provide sensorless SRMs suitable for controlling the operation of SRMs through detection of the changes of the current in each phase without employing sensor discs and position detection sensors for the detection of the position of a rotor.

This and other objects of this invention can be achieved by providing a sonsorless switched reluctance motor.

A sensorless switched reluctance motors, comprising:

a motor driving part for driving the motor by exciting phases of the motor in a predetermined sequence;

a differentiating part for differentiating the currents exciting the phases of the motor respectively;

an amplifying part for amplifying output voltages from the differentiating part to proper levels; and a comparing part for comparing output voltages of the amplifying part with reference voltages respectively, to generate a high level signal in case the output voltage of the amplifying part is higher than the reference voltage and a low level signal in case the output voltage of the amplifying part is lower than the reference voltage.

A sensorless switched reluctance motor comprising:

a motor driving part for driving the motor by exciting phases of the motor in a predetermined sequence;

a filtering part for filtering currents exciting the phases of the motor respectively;

a first amplifying part for amplifying output voltages from said filtering part to first proper levels, a first comparing part for comparing output voltages of the first amplifying part with first reference voltages respectively, to generate a high level signal in case the output voltage of the first amplifying part is higher than the first reference voltage and a low level signal in case the output voltage of the first amplifying part is lower than the first reference voltage;

a delaying part for delaying the output voltages from said filtering part for predetermined times;

a second amplifying part for amplifying the output voltages from the delaying part to second proper levels;

a second comparing part for comparing output voltages from the second amplifying part with the second reference voltages respectively, to generate the high level signal in case the output voltage of the second amplifying part is higher than the second reference voltage and the low level signal in case the output voltage of the second amplifying part is lower than the second reference voltage; and an OR gating part for logical operating the output signals from the first comparing part and the output signals from said second comparing part.

A sensorless switched reluctance motor comprising:

a motor driving part for driving the motor by exciting phases of the motor in a predetermined sequence;

an adding part for adding the current of each phase;

a low pass filtering part for filtering the output signals from the adding part;

a first amplifying part for amplifying output voltages from the low pass filtering part to first proper levels;

a first comparing part for comparing output voltages of the first amplifying part with the first reference voltages respectively, to generate a high level signal in case the output voltage of the first amplifying part is higher than the first reference voltage and a low level signal in case the output voltage of the first amplifying part is lower than the first reference voltage;

a delaying part for delaying the output voltages from the filtering part for predetermined times;

a second amplifying part for amplifying the output voltages from the delaying part to second proper levels;

a second comparing part for comparing output voltages from the second amplifying part with the second reference voltages respectively, to generate the high level signal in case the output voltage of the second amplifying part is higher than the second reference voltage and the low level signal in case the output voltage of the second amplifying part is lower than the second reference voltage; and an OR gating part for logically operating on the output signals from the first comparing part and the output signals from the second comparing part.

BRIEF DESCRIPTION OF THE DRAWINGS

FIGS. 3A and 3B show wave patterns of each part of FIGS. 2A and 2B.

FIGS. 4A, 4B and 4C show changes of inductance of each phase according to the changes of rotation angle.

FIGS. 6A to 6I show wave patterns of each part of FIG. 5.

FIGS. 8A to 8I show wave patterns of each part of FIGS. 7A and 7B.

FIGS. 10A to 10E show wave patterns of each part of FIG. 9.

FIG. 11 is a circuit diagram of a sensorless SRM according to a fourth embodiment of this invention.

FIG. 12 is a circuit diagram of a sensorless SRM according to a fifth embodiment of this invention.

DETAILED DESCRIPTION OF THE INVENTION

Figure 5:
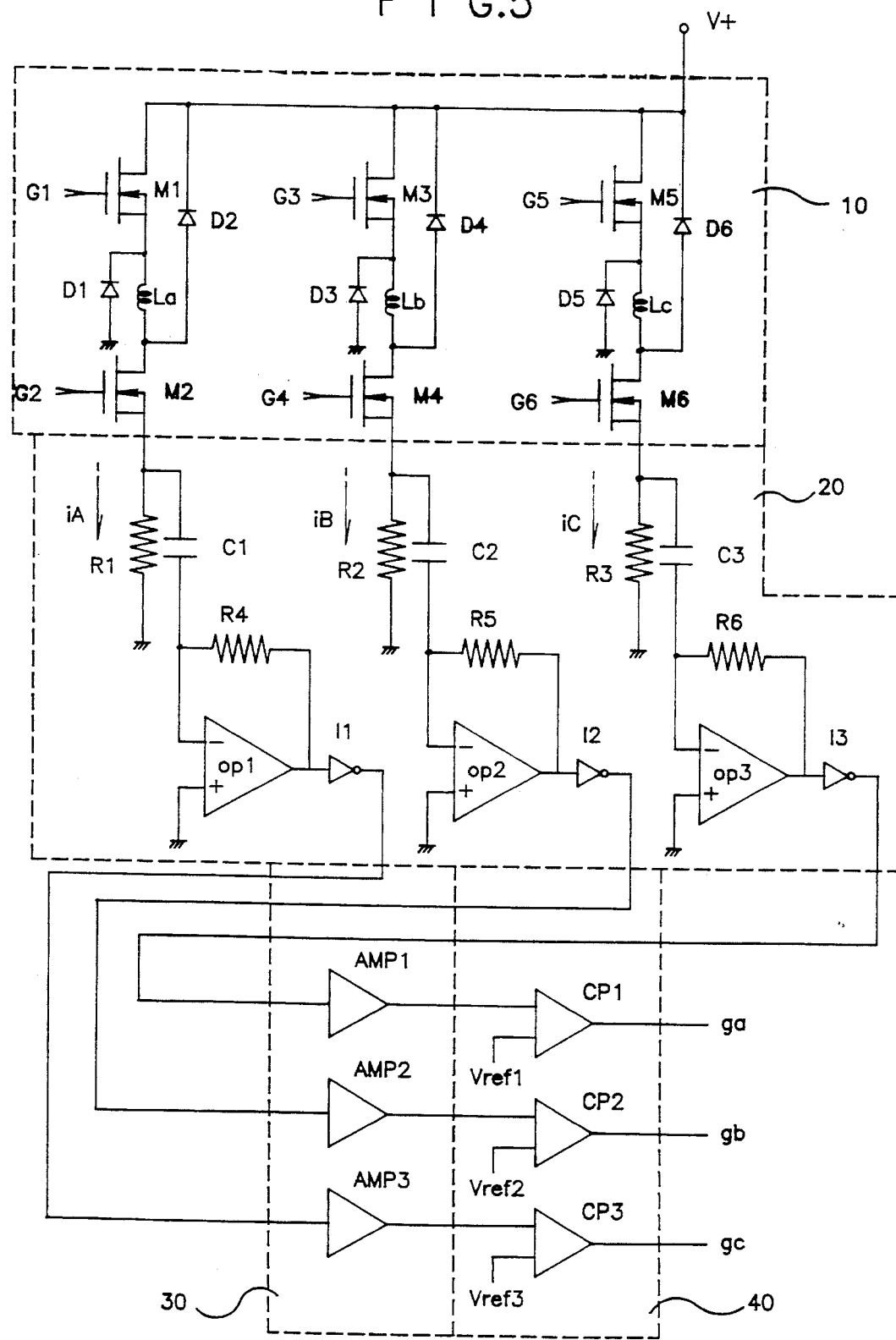
FIG. 5 is a circuit diagram of a sensorless SRM according to a first embodiment of this invention.

FIG. 5 is a circuit diagram of a sensorless SRM according to a first embodiment of this invention.

The sensorless SRM includes a motor driving part 10 for driving a motor through excitation of each phase of the motor in a predetermined sequence. A differentiating part 20 differentiates the currents of each phase of the motor driving part 10. An amplifying part 30 amplifies the phase voltages transmitted from the differentiating part 20 to a proper level. A comparing part 40 compares the output voltage of the amplifying part 30 with a reference voltage, and transmits signals having a level higher than the reference voltage.

The motor driving part 10 has transistors M1 and M2, M3 and M4, and M5 and M6, diodes D1 to D5, and coils La, Lb and Lc.

The transistor M1 and the transistor M2 are connected in series. The drain of transistor M1 is connected with a cathode of the diode D1 which has a grounded anode and one terminal of the coil La. A source of the transistor M2 is connected with an anode of the diode D2, which has a cathode connected to a source of the transistor M1 and another terminal of the coil La.

In this manner, the pairs of transistors M3 and M4, M5 and M6 are connected with the diodes D3 and D4, and D5 and D6, and coils Lb and Lc respectively.

The transistors M1 and M2, M3 and M4, and M5 and M6 are turned on when predetermined signals are applied to gates G1 and G2, G3 and G4, and G5 and G6 of the transistors M1 and M2, M3 and M4, and M5 and M6.

In the coils La, Lb and Lc, current flows through the transistors M1 to M6 when transistors M1 to M6 are turned on.

Changes of inductance of each phase following the rotation of the rotor 1 occurs as shown in FIG. 4 on the flow of the current in the coils La, Lb and Lc.

The differentiating part 20 has amplifiers OP1 to OP3, resistors R1 to R6 and capacitors C1 to C3. The inversion terminal(−) of the amplifier OP1 is connected with the capacitor C1 and resistor R4 in parallel and the non-inversion terminal(+) is grounded.

The drain of the transistor M2 in the motor driving part 10 is connected to a node between the capacitor C1 and the resistor R1 in the differentiating part 20.

In this manner, the amplifiers OP2 and OP3 are connected with the respective corresponding capacitors C2 and C3 and resistors R2 and R5, and R3 and R6 to constitute additional differentiators.

Due to the generation of reverse electromotive force in the winding of the stator 6 by the rotation of the rotor 1, phase currents iA, iB and iC as shown in FIGS. 6A, 6B and 6C flow through the phase current detection resistors R1 to R3.

The currents iA, iB and iC flowing through the phase detection resistors R1, R2 and R3 are differentiated to be output as certain voltages, while flowing through the capacitors C1 to C3, the resistors R4 to R6 and the amplifiers OP1 to OP3, respectively.

Output signals of the amplifiers OP1 to OP3 are provided to corresponding inverters I1 to I3. Thus, the output signals of the amplifiers OP1 to OP3 are inverted.

The output signals of the inverters I1 to I3 is the same as shown in FIGS. 6D, 6E and 6F.

FIG. 6A corresponds to 6D, 6B to 6E and 6C to 6F.

Referring to FIGS. 6A and 6D, on starting of the rise of the phase current iA, the output signal of the inverter I1 starts to fall. On finish of the rise of the phase current iA, the output signal of the inverter I1 finishes the fall of the output signal of the inverter I1.

The amplifying part 30 has amplifiers AMP1 to AMP3 which are connected to the output terminals of the differentiating part 20. Amplifiers AMP1 to AMP 3 amplify the output signals from the differentiating part 20 to proper levels, and supply the amplified signals to the comparing part 40.

The comparing part 40 has comparators CP1 to CP3 which compare the output signals of the amplifying part 30 with reference voltages Vref1, Vref2 and Vref3.

The output signal of the amplifier AMP1 is compared to the reference voltage Vref1 in the comparator CP1. The output signal of the amplifier AMP2 is compared to the reference voltage Vref2 in the comparator CP2. The output signal of the amplifier AMP3 is compared to the reference voltage Vref3 in the comparator CP3.

When the output signal of the amplifying part 30, as compared by the comparing part 40, is higher than the reference voltage, a high level signal is generated. When the output signal of the amplifying part 30, as compared by the comparing part 40, is lower than the reference voltage, a low level signal is generated.

In conclusion, the output signals from the comparators CP1 to CP3 are the same as shown in FIGS. 6G, 6H and 6I. Further, the output signals from the comparators CP1 to CP3 are applied to the gates G1 and G2, G3 and G4, and G5 and G6 of each pairs of transistors M1 and M2, M3 and M4, and M5 and M6, respectively. Therefore, by utilizing the above output signals, the position of the rotor 1 can be detected.

Figure 7A:
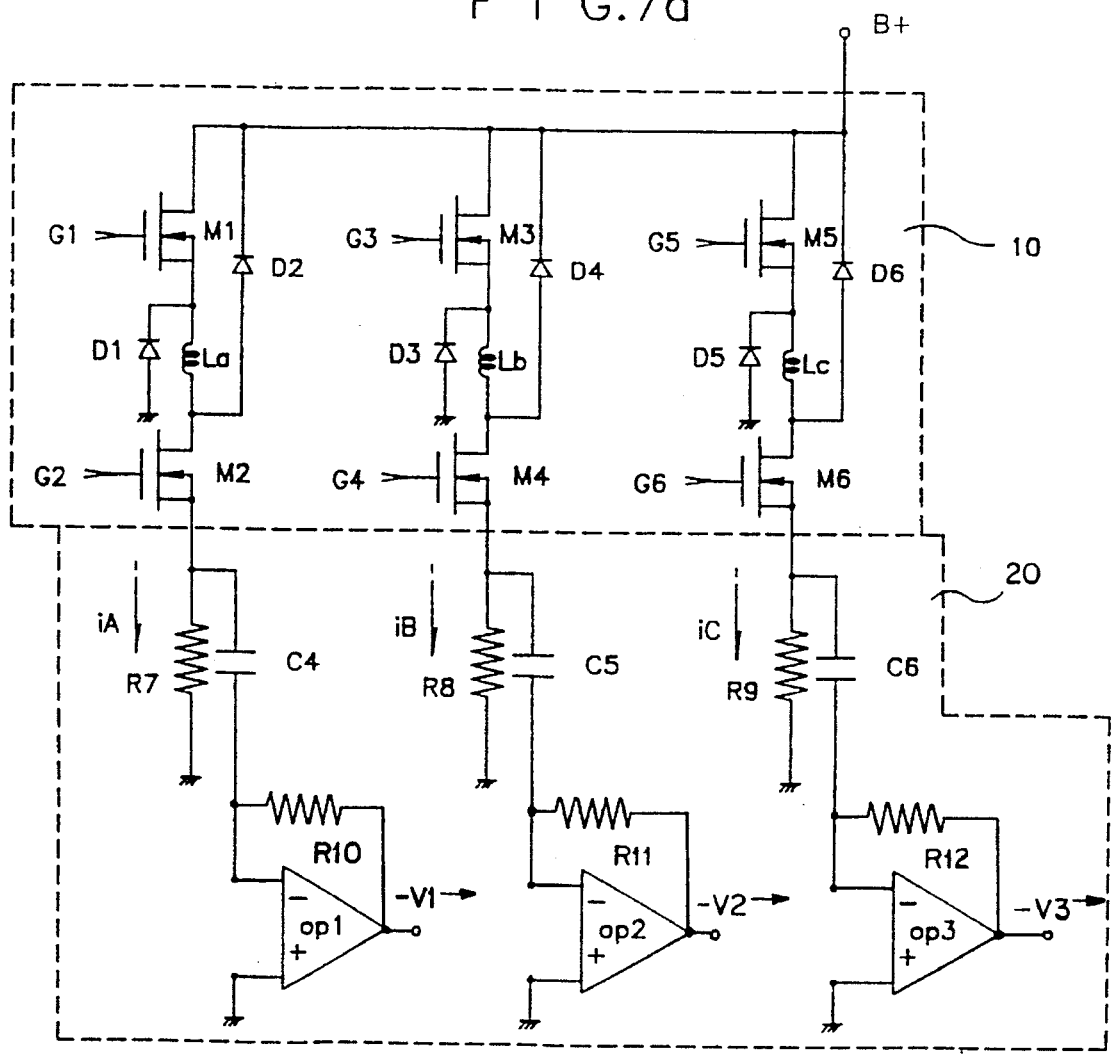
FIGS. 7A and 7B is a circuit diagram of a sensorless SRM according to a second embodiment of this invention.
Figure 7B:
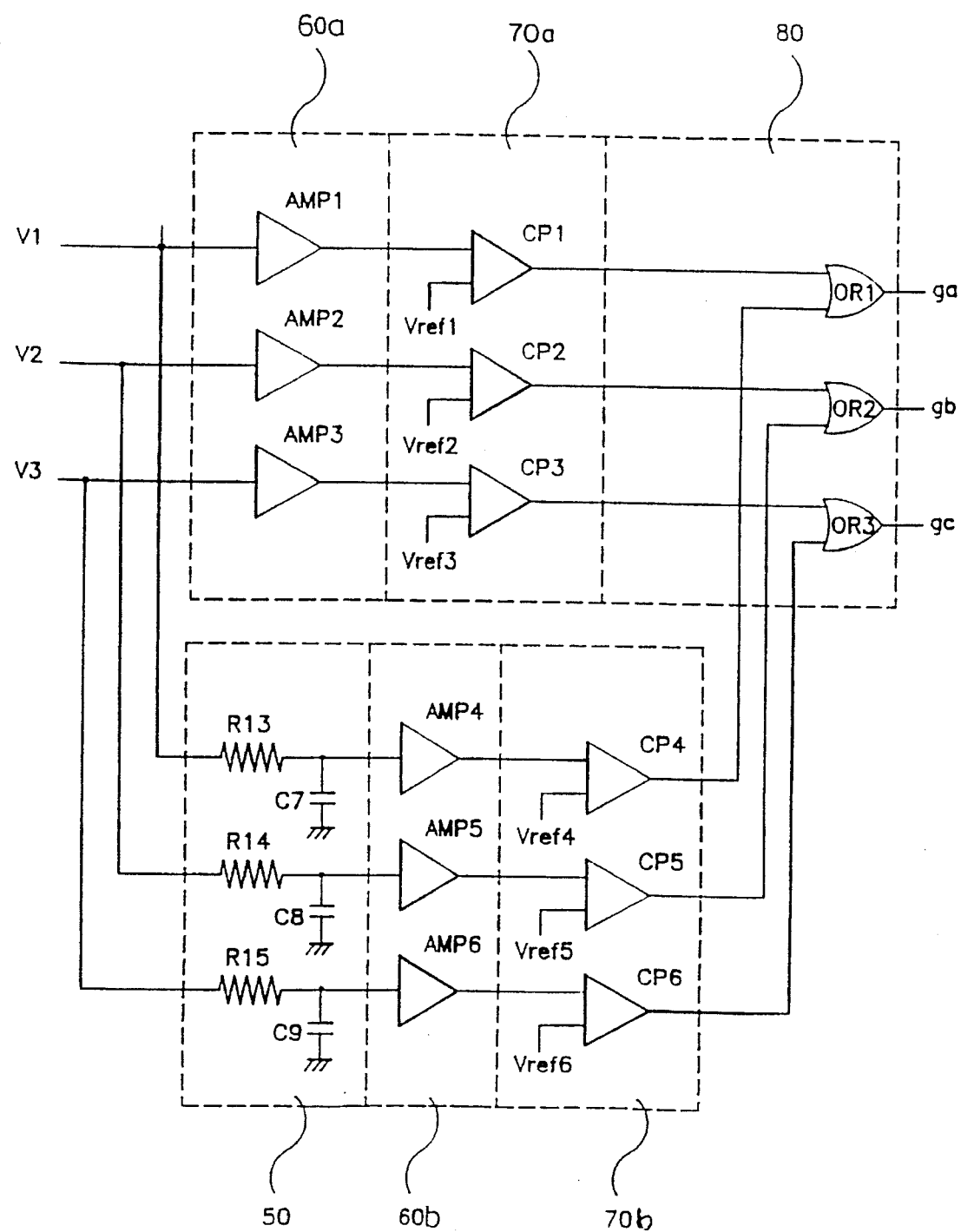

FIGS. 7A and 7B are circuit diagrams of a sensorless SRM according to a second embodiment of this invention. In FIG. 7B, 60a is a first amplifying part, 70a is a first comparing part, 50 is a delaying part, 60b is a second amplifying part, 70b is a second comparing part and 80 is an OR gating part.

The sensorless SRM includes the motor driving part 10 for driving the motor through excitation of each phase of the motor in a predetermined sequence. A filtering part 20 filters the currents of each phase of the motor driving part 10. A first amplifying part 60a amplifies phase voltages V1, V2 and V3 transmitted from the filtering part 20 to a proper level. A first comparing part 70a generates high level signals when the output voltages VA, VB and VC of the first amplifying part 60a are higher than reference voltages Vref1, Vref2 and Vref3 by comparing the output voltages VA, VB and VC of the first amplifying part 60a with reference voltages. A delaying part 50 delays the phase voltages V1, V2 and V3, transmitted from the filtering part 20 for certain times. A second amplifying part 60b amplifies the output voltages from the delay part 50 to proper levels. A second comparing part 70b generates high level signals when the phase voltages VA', VB' and VC', transmitted from the second amplifying part 60b, are higher than reference voltages Vref4, Vref5 and Vref6 by comparing the phase voltages with the reference voltages Vref4, Vref5 and Vref6, and low level signals in other cases. An OR gating part 80 OR gates the output signals from the first comparing part 70a and the second comparing part 70b.

Because the circuitry operation of the motor driving part 10, shown in FIG. 7A, is the same as motor driving part 10 described in the first embodiment, the description of its operation is omitted here.

The filtering part 20 consists of a plurality of filters each having an amplifier OP1. The inversion terminal(−) is connected with a resistor R10 and a capacitor C5, connected in parallel. The non-inversion terminal(−) is connected to ground. A high pass filter, including a phase current detection resistor R7, is connected with a capacitor C4 in series. Another filter having an amplifier OP2 connected with a capacitor C5, a resistor R11 and a phase current detection resistor R8 is connected in the same way as the first block. Another block having an amplifier OP3 connected with a capacitor C6, a resistor R12 and a phase current detection resistor R8 is also connected in the same manner as the first block.

The drain of the transistor M2, from the motor driving part 10, is connected at a node between the capacitor C4 and the phase current detection resistor which are connected in series in the filtering part 20. The drain of the transistor M4 is connected at a node between the capacitor C5 and the phase current detection resistor R8, which are connected in series. The drain of the transistor M6 is connected at a node between the capacitor C6 and the phase current detection resistor R9, which are also connected in series.

Upon the operation of each pairs of transistors M1 and M2, M3 and M4, and M5 and M6 in the motor driving part 10, the phase currents iA, iB and iC flow in the phase current detection resistors R7 to R9 of the filtering part 20 as shown in FIGS. 8(A), 8(B) and 8(C), respectively.

The currents flowing through the drains of the transistors M2, M4 and M6 are distributed respectively to be filtered by the high pass filters each having a amplifier, a resistor and a capacitor.

The output signals −V1, −V2 and −V3 of the amplifiers OP1 to OP3 are inverted through separate inversion process and transmitted to the first amplifying part 60a and the delaying part 50, respectively.

The first amplifying part 60a has the amplifiers AMP1 to AMP3, which amplify the output signals of the filtering part 20 to proper levels to transmit it to the first comparing part 70a.

The first comparing part 70a has comparators CP1 to CP3. They compare the output signals of the first amplifier 60a with reference voltages Vref1, Vref2 and Vref3 and generates high level signals when the output signals are higher than the reference voltages Vref1, Vref2 and Vref3.

The delaying part 50 is an integrator type and includes resistors R13 to R15 and capacitors C7 to C9. The signals delayed in the delaying part 50 are transmitted to the second amplifying part 60B.

The second amplifying part 60a has amplifiers AMP4 to AMP6. In the second amplifier 60a, the output signals of the delaying part 50 are amplified to proper levels and transmitted to the second comparing part 70B thereafter.

The outputs of the first and the second amplifying parts 60a and 60b are as shown in FIGS. 8D, 8E and 8F in which waves with solid line represent the output signals of the first amplifying part 60a and waves with dotted line represent the output signals of the second amplifying part 60b.

The second comparing part 70b has comparators CP4 to CP6. The second comparing part 70b compares the output signals of the second amplifying part 60b with reference voltages Vref4 to Vref6 to generate high level signals when the output voltages are higher than the reference voltages Vref4 to Vref6 and low level signals when the output voltages are lower than the reference voltages Vref4 to Vref6.

The OR gating part 80 has OR gates OR1 to OR3 and receives the output signals from the first and the second comparing parts 70a and 70b.

The OR gate OR1 receives the output signals of the comparator CP1 and the comparator CP4. The OR gate OR2 receives the output signals of the comparator CP2 and the comparator CP5. The OR gate OR3 receives the output signals of the comparator CP3 and the comparator CP6.

The output signals generated in the OR gates OR1 to OR3 are as shown in FIGS. 8G, 8H and 8I, respectively. They are applied to the gates G1 and G2, G3 and G4, and G5 and G6 of the each pairs of transistors M1 and M2, M3 and M4, and M5 and M6 of the motor driving part 10.

Thus, the position of the rotor 1 can be detected utilizing the output signals Of the OR gates OR1 to OR3. The advance angle of the SRM can be adjusted through the adjustment of the resistances of the resistors R7 to R9 and the capacitances of the capacitors C4 to C6, of the delaying part 50.

Figure 9:
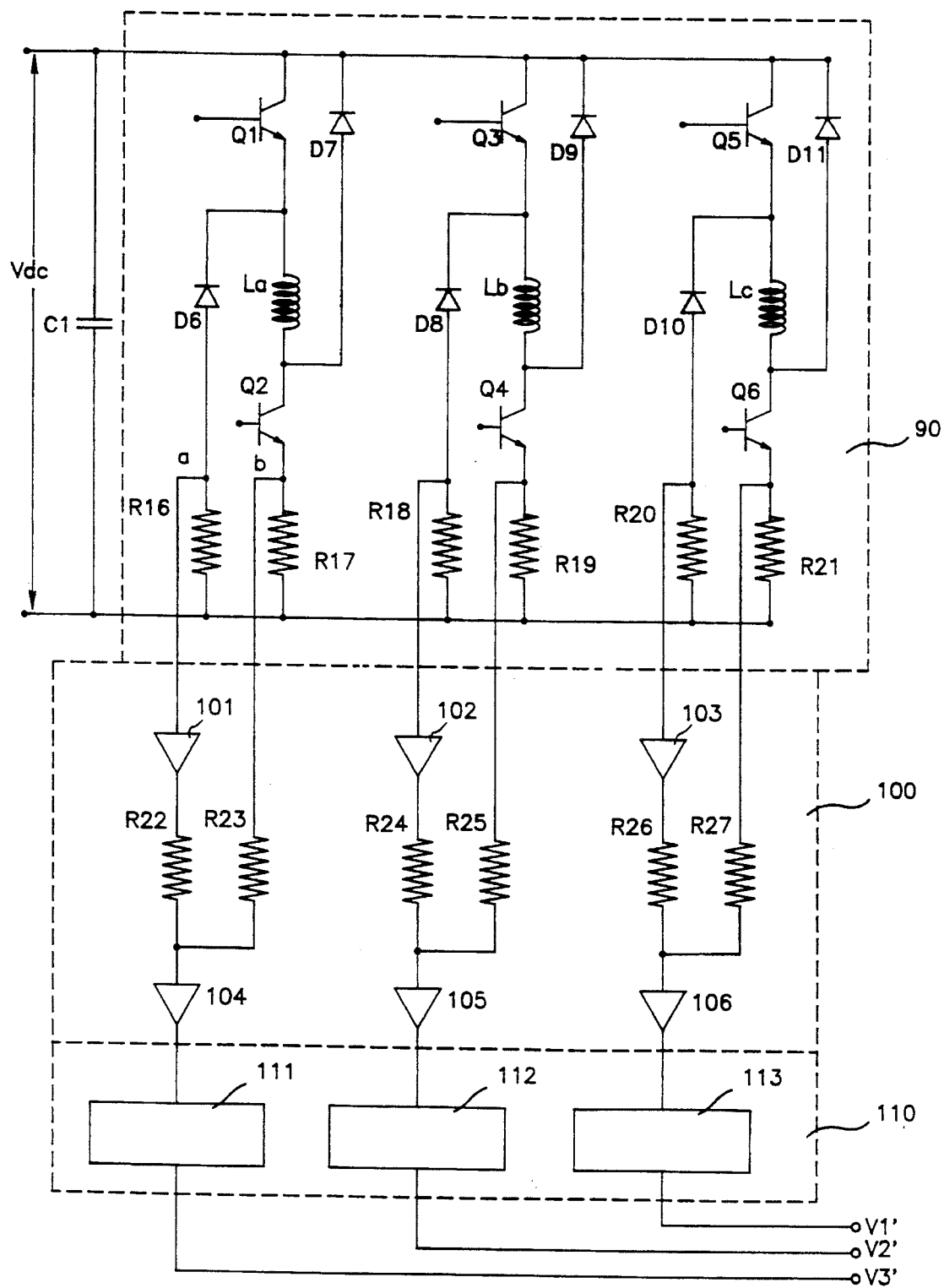
FIG. 9 is a circuit diagram of a sensorless SRM according to a third embodiment of this invention.

FIG. 9 is a circuit diagram of a sensorless SRM according to a third embodiment of this invention.

A motor driving part 90 includes the first transistor Q1 having the collector connected to a supply voltage source Vdc and the emitter connected to the cathode of a diode D6 and one terminal of a coil La. The second transistor Q2 has its collector connected to the other terminal of the coil La and the anode of the diode D7 and its emitter connected to a resistor R17. A transistor R16 is connected to the anode of the diode D6. In this manner, the pairs of transistors Q3 and Q4, and Q5 and Q6 are connected with coils Lb and Lc, diodes D8 and D9, and D10 and D11, and resistors R18 and R19, and R20 and R21.

When a high level signal of the pulse width modulation signal as shown in FIG. 10A is applied to the bases of the transistors Q1 and Q2, the transistors Q1 and Q2 are turned on. The passage of current is formed in the sequence of the coil La and the resistor R17. The current in the resistor R17 increases gradually while the transistors Q1 and Q2 are turning on.

If the low level signal of the pulse width modulation signal is applied to the bases of the transistors Q1 and Q2, the transistors Q1 and Q2 are turned off to form a current discharge flow passage in sequence with the resistor R16, diode D6, coil La and diode D7. Therefore, the current in the resistor R16 decreases gradually while the transistors Q1 and Q2 are turning off.

When the high level signal of the pulse width modulation signal is applied again to the bases of the transistors Q1 and Q2 during the decrease of the current, the transistors Q1 and Q2 are turned on again making the current in the resistor R17 flow again. Repetition of this operation results in the voltage on the resistor R17 as shown in FIG. 10B and the voltage on the resistor R16 as shown in FIG. 10C.

Accordingly, due to the direction of the current, the resistor R16 develops negative voltage as shown in FIG. 10C, and the resistor R17 develops positive voltage as shown in FIG. 10B.

An adding part 100 includes an inverter 101 connected to the cathode of the diode D6 of the motor driving part 90 for inverting the current in the resistor R16. The adder 104 for adding the currents flowing through the resistor R22, connected to the inverter 101, and the resistor R23, connected to the emitter of the transistor Q2 of the motor driving part 90. In this manner, adders 105 and 106 are connected with inverters 102 and 103 and resistors R24 and R25, and R26 and R27.

Figure 10D:
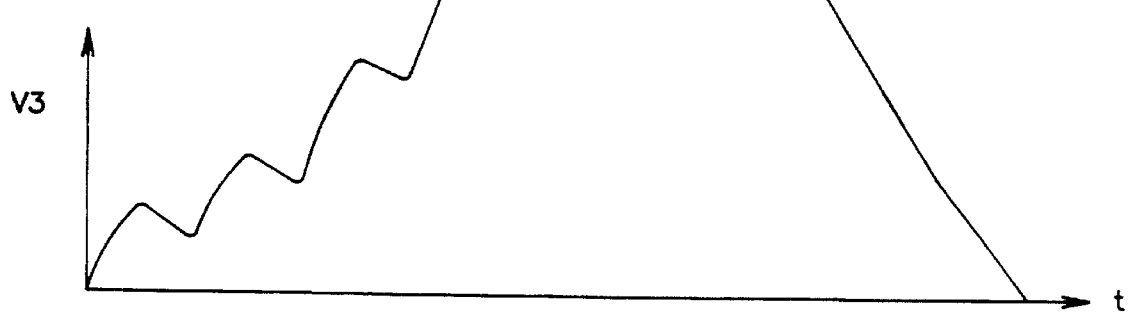

The inverter 101 inverts the voltage on the resistor R16 and transmits the inverted voltage to the adder 104. The adder 104 adds the output signal from the inverter 101 and the voltage on the resistor R17. The output signal of the adder 104 is as shown in FIG. 10D.

Figure 10E:
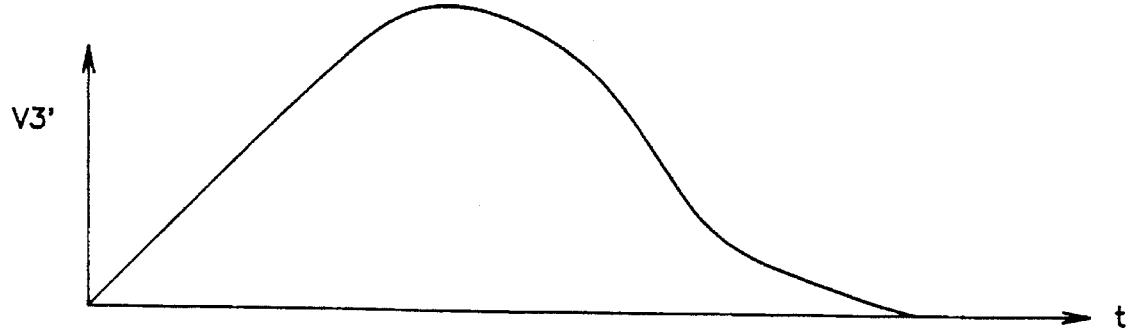

A filtering part 110 has three low pass filters 111 to 113. The low pass filter 111 filters the output signal of the adder 104 in order to prevent discontinuities in the shape of current flowing through the winding of the SRM. The resultant wave pattern is as shown in FIG. 10E.

FIG. 11 is a circuit diagram of a motor driving part 120 of a sensorless SRM according to a fourth embodiment of this invention.

In FIG. 11, pairs of transistors Q1 and Q2, Q3 and Q4 and Q5 and Q6 are connected in series. The emitters of the transistors Q1, Q3 and Q5 and the collectors of the transistors Q2, Q4 and Q5 and the collectors of the resistors R28, R29 and R30 and coils La, Lb and Lc are connected in series respectively. The diodes D6, D8 and D10 are connected to the emitters of the transistors, Q1, Q3 and Q5. The diodes D7, D9 and D11 are connected to the collectors of the transistors Q2, Q4 and Q6 and connected to the voltage supply source Vdc. The collectors of the transistors Q1, Q2 and Q3 are also connected to the voltage supply source Vdc.

It is shown that it is possible to detect the current flowing in each phase with only one current detection resistor R28, R29 or R30 while the pairs of transistors Q1 and Q2, Q3 and Q4, and Q5 and Q6 are being turned on and off.

For example, if the bases of the transistors Q1 and Q2 are applied with the high level of the pulse width modulation signal, the transistors Q1 and Q2 are turned-on making the current flow passage in the sequence of the current detection resistor R28 and the coil La. Therefore, the current wave pattern can be detected from the current detection resistor R28 while the transistors Q1 and Q2 are turning on.

In this time, if the bases of the transistors Q1 and Q2 are applied with the low level of the pulse width modulation signals, the transistors Q1 and Q2 are turned off making the current discharge flow passage in the sequence of the diode D6, the current detection resistor R28, the coil La and the diode D7. Therefore, the current wave pattern can be detected from the current detection resistor R28 while the transistors Q1 and Q2 are turning off.

In conclusion, the current wave pattern for the windings of each phase can be detected while one pair of transistors Q1 and Q2 are turning on and off.

Figure 1:
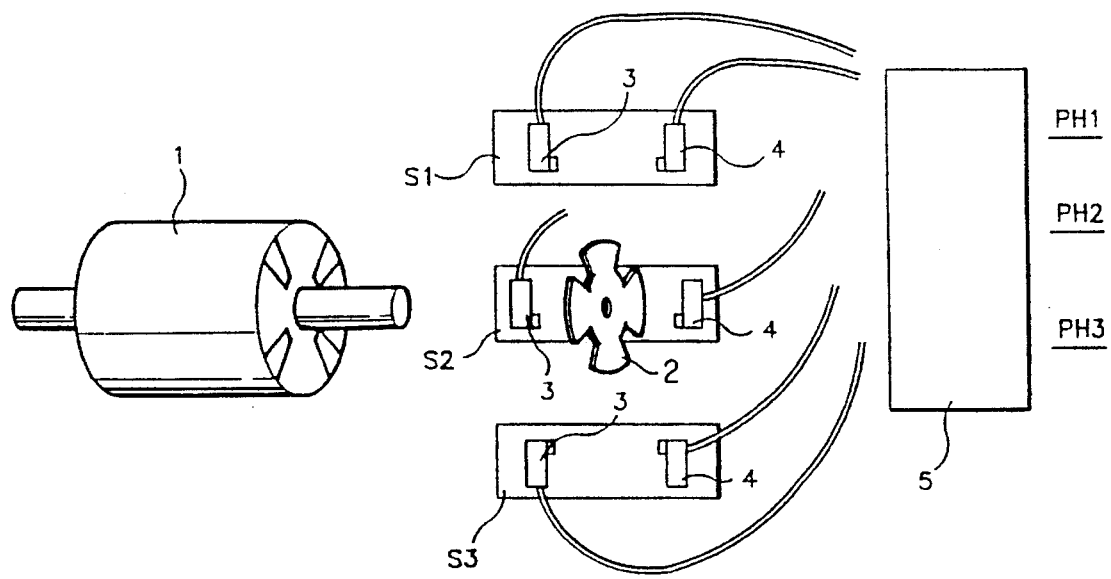
FIG. 1 shows a rotor and sensors of a conventional SRM.
Figure 2A:
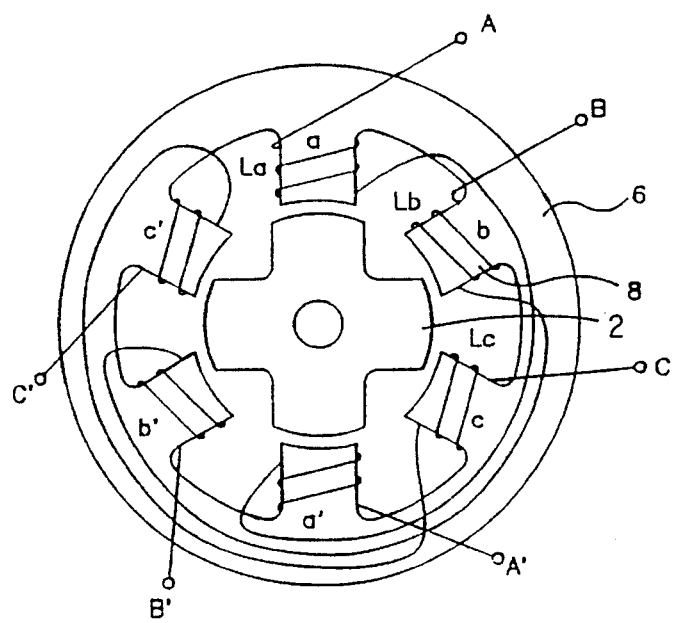
FIG. 2A shows a stator and the rotor of a conventional SRM.
Figure 2B:
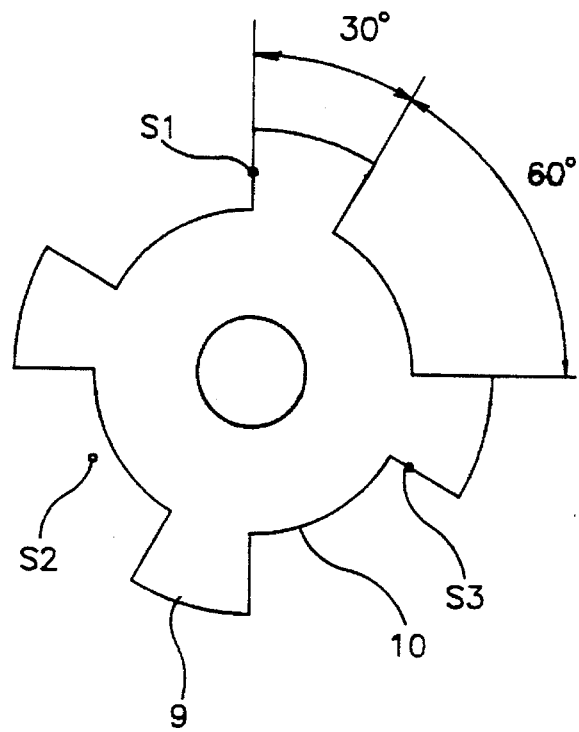
FIG. 2B shows a sensor disc of a conventional SRM.
Figure 3A:
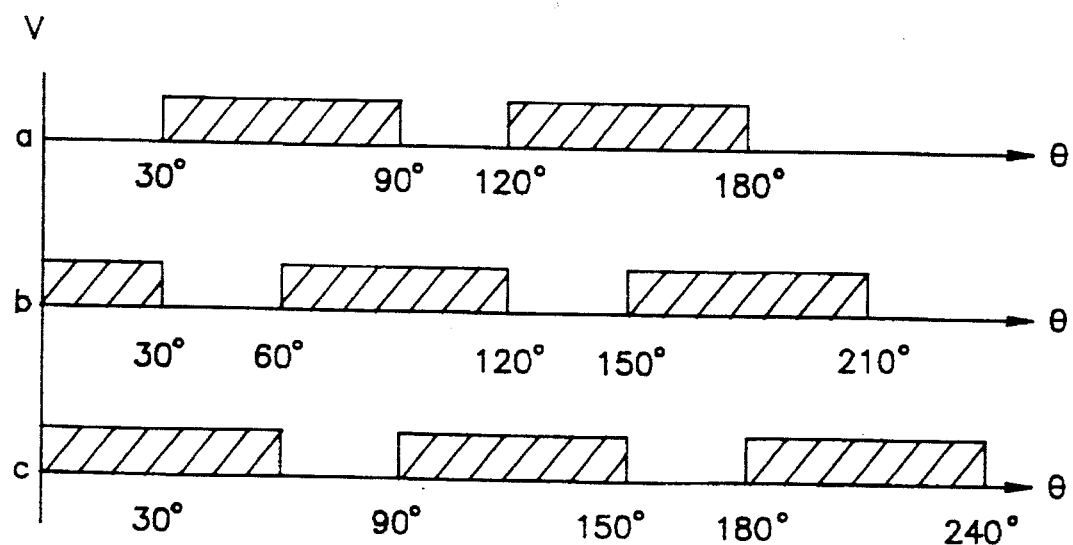

FIG. 12 is a circuit diagram of a motor driving part 130 of a sensorless SRM according to a fifth embodiment of this invention. Up to now, the projected part of the stator 6 is wound with single winding as shown in FIG. 2A. In the fifth embodiment a projected part of the stator 6 having two windings is described.

As shown in FIG. 12, transistors Q7, Q8 and Q9, coils L1, L3 and L5, and current detection resistors R28, R30 and R32 are connected in series. Diodes D11, D12 and D13, coils L2, L4 and L6, and current detection resistors R29, R31 and R33 are connected in series. Both series are connected between the plus terminal and minus terminal of the supply voltage source Vdc in parallel. Transistors Q7, Q8 and Q9 have their collectors connected with coils L1, L3 and L5 and their emitters connected with the current detection resistors R28, R30 and R32.

Coil L1 and coil L2, coil L3 and coil L4, and coil L5 and coil L6, are in mutual induction. The transistor Q7 is turned on when the transistor Q7 is applied with the high level of the pulse width modulation signal. The current flow passage is formed in the sequence of the coil L1 and the current detection resistor R28 when the transistor Q7 is turned on.

Even though current flows in the coil L2 by the self-induction thereof, current does not flow in the coil L2 due to the diode 11 positioned in the reverse direction. In this condition, if the base of the transistor Q7 is applied with the low level of the pulse width modulation signal to turn off the transistor Q7, the current discharge flow passage is formed in the sequence of the current detection resistor R29, the coil L2 and the diode D11.

According to this invention, the sensorless SRM has the advantages of enabling proper operation in unfavorable conditions such as high temperature and the like as well as making the product compact by identifying the position of rotor through the detection of the change of each phase current without providing separate sensors for identifying the position of the rotor of the SRM.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A switch for a sensorless switched reluctance motor comprising:

motor driving means for driving the motor by exciting phases of the motor with current in a predetermined sequence;

filtering means for filtering the current exciting the phases of the motor;

first amplifying means for amplifying output voltages from said filtering means to respective first proper levels;

first comparing means for comparing output voltages of said first amplifying means with first references voltages respectively, to generate a high level signal when the output voltage of said first amplifying means is higher than the respective first reference voltage and a low level signal when the output voltage of said first amplifying means is lower than the respective first reference voltage;

delaying means for delaying the output voltages from said filtering means for predetermined times;

second amplifying means for amplifying the output voltages from said delaying means to respective second proper levels;

second comparing means for comparing output voltages from said second amplifying means with second reference voltages respectively, to generate a high level signal when the output voltage of said second amplifying means is higher than the respective second reference voltage and a low level signal when the output voltage of said second amplifying means is lower than the respective second reference voltage; and OR gating means for ORing the output signals from said first comparing means and the output signals from said second comparing means.

2. A switch for a sensorless switched reluctance motor as claimed in claim 1, wherein said OR gating means includes a plurality of OR gates.

3. A switch for a sensorless switched reluctance motor comprising:

motor driving means for driving the motor by exciting phases of the motor in a predetermined sequence;

adding means for adding the current of each phase;

low pass filtering means for filtering the output signals from said adding means;

first amplifying means for amplifying output voltages from said low pass filtering means to respective first proper levels;

first comparing means for comparing output voltages of said first amplifying means with first reference voltages respectively, to generate a high level signal when the output voltage of said first amplifying means is higher than the respective first reference voltage and a low level signal when the output voltage of said first amplifying means is lower than the respective first reference voltage;

delaying means for delaying the output voltages from said filtering means for predetermined times;

second amplifying means for amplifying the output voltages from said delaying means to respective second proper levels;

second comparing means for comparing output voltages from said second amplifying means with second reference voltages respectively, to generate a high level signal when the output voltage of said second amplifying means is higher than the respective second reference voltage and a low level signal when the output voltage of said second amplifying means is lower than the respective second reference voltage; and OR gating means for ORing the output signals from said first comparing means and the output signals from said second comparing means.

* * * * *